US012656204B2

(12) United States Patent
Agapiou et al.

(10) Patent No.: US 12,656,204 B2
(45) Date of Patent: Jun. 16, 2026

(54) SYSTEMS AND METHODS FOR AIR GAP AND ECCENTRICITY DETECTION FOR ELECTRIC MOTOR

(71) Applicant: GM GLOBAL TECHNOLOGY OPERATIONS LLC, Detroit, MI (US)

(72) Inventors: John S. Agapiou, Rochester Hills, MI (US); Anmol Aggarwal, Waterford, MI (US); Sean Robert Wagner, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 18/491,137

(22) Filed: Oct. 20, 2023

(65) Prior Publication Data

US 2025/0130130 A1      Apr. 24, 2025

(51) Int. Cl.
| | |
|---|---|
| *G01M 1/08* | (2006.01) |
| *G01M 1/18* | (2006.01) |
| *G01M 1/22* | (2006.01) |
| *G01M 1/28* | (2006.01) |

(52) U.S. Cl.
CPC ............... *G01M 1/22* (2013.01); *G01M 1/08* (2013.01); *G01M 1/18* (2013.01); *G01M 1/28* (2013.01)

(58) Field of Classification Search
CPC ............ G01M 1/02; G01M 1/08; G01M 1/16; G01M 1/18; G01M 1/22; G01M 1/28
See application file for complete search history.

(56) References Cited

U.S. PATENT DOCUMENTS

| | | | |
|---|---|---|---|
| 8,910,371 | B2 | 12/2014 | Kleber et al. |
| 9,621,012 | B2 | 4/2017 | Agapiou et al. |
| 9,866,092 | B2 | 1/2018 | Hanna et al. |
| 9,973,067 | B2 | 5/2018 | Hanna et al. |
| 10,164,508 | B2 | 12/2018 | Agapiou et al. |
| 10,574,122 | B2 | 2/2020 | Perry et al. |
| 10,879,752 | B2 | 12/2020 | Agapiou et al. |
| 10,958,144 | B2 | 3/2021 | Agapiou et al. |
| 2018/0287526 | A1 * | 10/2018 | Iwaji ...................... H02P 6/182 |
| 2020/0348207 | A1 * | 11/2020 | Wang ...................... H02H 3/50 |
| 2021/0031297 | A1 | 2/2021 | Wang et al. |
| 2022/0231587 | A1 | 7/2022 | Agapiou et al. |

FOREIGN PATENT DOCUMENTS

| | | | | |
|---|---|---|---|---|
| JP | 2003235289 | A * | 8/2003 | |
| KR | 101210825 | B1 | 12/2012 | |
| WO | WO-2011006528 | A1 | 1/2011 | |
| WO | WO-2013035948 | A1 * | 3/2013 | ........... G01R 31/343 |

OTHER PUBLICATIONS

Office Action dated May 17, 2024 from German Patent Office for German Patent No. 102023135679.8; 4pgs.

* cited by examiner

*Primary Examiner* — Douglas X Rodriguez
*Assistant Examiner* — Kendrick X Liu

(57) ABSTRACT

An eccentricity detection system includes: a vibration eccentricity module configured to determine a vibration eccentricity of the electric motor based on vibration of the electric motor measured during operation of the motor; an inductance eccentricity module configured to determine an inductance eccentricity of the electric motor based on an incremental inductance curve of the electric motor; and a fault module configured to indicate whether the electric motor includes an eccentricity fault based on both (a) the vibration eccentricity of the electric motor and (b) the inductance eccentricity of the electric motor.

20 Claims, 11 Drawing Sheets

SYSTEMS AND METHODS FOR AIR GAP AND ECCENTRICITY DETECTION FOR ELECTRIC MOTOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors and more particularly to systems and methods for detecting air gap and eccentricity errors of electric motors, such as of vehicles.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, an eccentricity detection system includes: a vibration eccentricity module configured to determine a vibration eccentricity of the electric motor based on vibration of the electric motor measured during operation of the motor; an inductance eccentricity module configured to determine an inductance eccentricity of the electric motor based on an incremental inductance curve of the electric motor; and a fault module configured to indicate whether the electric motor includes an eccentricity fault based on both (a) the vibration eccentricity of the electric motor and (b) the inductance eccentricity of the electric motor.

In further features, the fault module is configured to selectively indicate that the electric motor has an eccentricity fault when the vibration eccentricity is greater than a predetermined value.

In further features, the fault module is configured to selectively indicate that the electric motor has an eccentricity fault when the inductance eccentricity is greater than a predetermined value.

In further features, a voltage eccentricity module is configured to determine a voltage eccentricity of the electric motor based on a voltage command for the electric motor, where the fault module is configured to indicate whether the electric motor includes an eccentricity fault further based on the voltage eccentricity.

In further features, the fault module is configured to selectively indicate that the electric motor has an eccentricity fault when the voltage eccentricity is greater than a predetermined value.

In further features, the voltage command is a d-axis voltage command.

In further features, the voltage command is a q-axis voltage command.

In further features, the voltage eccentricity module is configured to determine the voltage eccentricity of the electric motor when the electric motor is operating at a predetermined speed.

In further features, the voltage eccentricity module is configured to determine the voltage eccentricity of the electric motor when the electric motor is operating at a predetermined torque.

In further features, the vibration eccentricity module is configured to determine the vibration eccentricity of the electric motor when the electric motor is operating at a predetermined speed.

In further features, the vibration eccentricity module is configured to determine the vibration eccentricity of the electric motor based on an amplitude of the vibration of the electric motor at a predetermined frequency.

In further features, the inductance eccentricity module configured to determine the inductance eccentricity of the electric motor based on a d-axis current of the electric motor at a predetermined point on the incremental inductance curve of the electric motor.

In further features, the predetermined point is a peak of the incremental inductance curve.

In further features, the peak is a second highest peak of the incremental inductance curve.

In further features, the inductance eccentricity module is configured to determine the inductance eccentricity of the electric motor when a d-axis current of the electric motor is set to a predetermined maximum current.

In further features, the fault module is configured to indicate that the electric motor includes an eccentricity fault when both (a) the vibration eccentricity of the electric motor is greater than a predetermined value and (b) the inductance eccentricity of the electric motor is less than a second predetermined value.

In further features, the fault module is configured to selectively indicate that the electric motor includes an eccentricity fault when the vibration eccentricity of the electric motor is greater than a predetermined value and the inductance eccentricity of the motor is greater than a second predetermined value.

In further features, the fault module is configured to selectively indicate that the electric motor includes an eccentricity fault when the inductance eccentricity of the electric motor is greater than a predetermined value and the vibration eccentricity of the motor is less than a second predetermined value.

In further features, the fault module is configured to selectively indicate that the electric motor includes an eccentricity fault when the inductance eccentricity of the electric motor is greater than a predetermined value, the vibration eccentricity of the motor is less than a second predetermined value, and an amplitude of vibration at a frequency is less than a third value.

In a feature, an eccentricity detection method includes: determining a vibration eccentricity of the electric motor based on vibration of the electric motor measured during operation of the motor; determining an inductance eccentricity of the electric motor based on an incremental inductance curve of the electric motor; and indicating whether the electric motor includes an eccentricity fault based on both (a) the vibration eccentricity of the electric motor and (b) the inductance eccentricity of the electric motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An inverter module of a vehicle includes legs of switches that regulate current flow (a) from a battery to an electric motor and (b) from the electric motor to the battery. A direct current (DC) bus capacitor may be connected between the inverter module and the battery. Pulse width modulated (PWM) signals are used to control switching of the legs.

Electric motors can have various different types of faults. One type of fault is an eccentricity fault. Eccentricity faults may occur, for example, due to manufacturing and/or assembly tolerances. Eccentricity faults create an unbalanced magnetic field, which may cause vibration, noise, and increased forces in one or more motor bearings, which may lead to increased wear, earlier failure, and increased losses. Over time, eccentricity may further increase and cause a rotor and a stator of the motor to contact.

The present application involves a fault detection module that detects an eccentricity fault of an electric motor based on vibration and incremental inductance of the electric motor. In various implementations, the detection of the eccentricity fault may further be based on voltage commands for the motor. In vehicles, this detection may be performed before a vehicle is sold. The use of vibration and incremental inductance (and in some examples also voltage commands) is a more robust measure of eccentricity that limits the possibility of false detections and increases accuracy of detecting eccentricity faults of electric motors.

Figure 1:
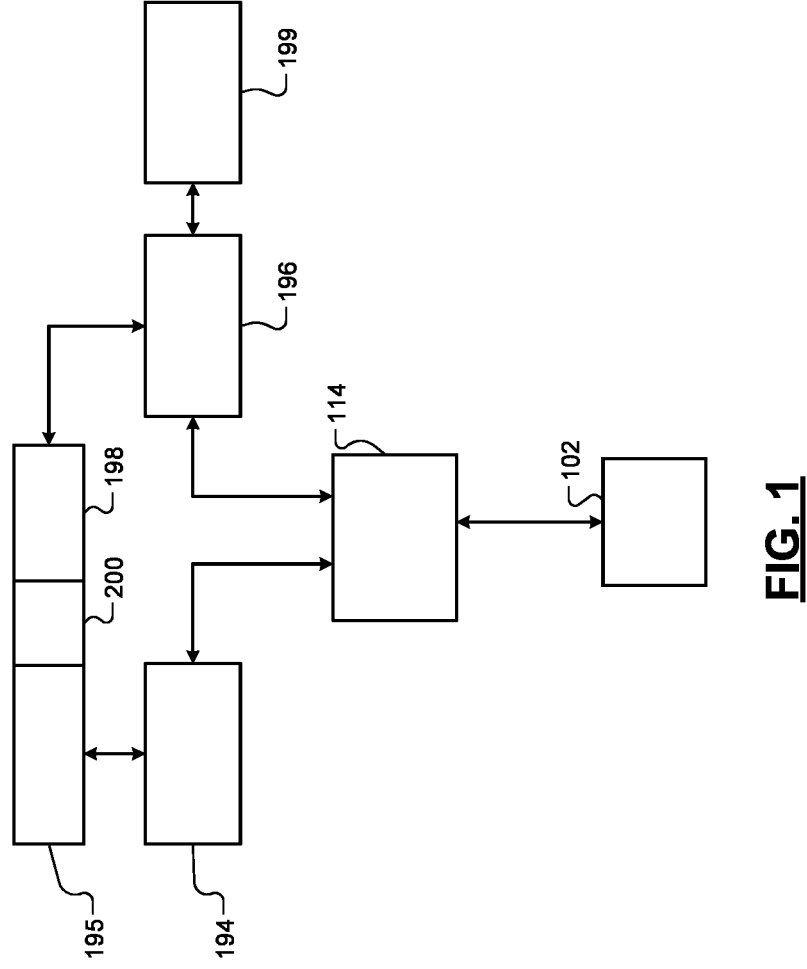
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
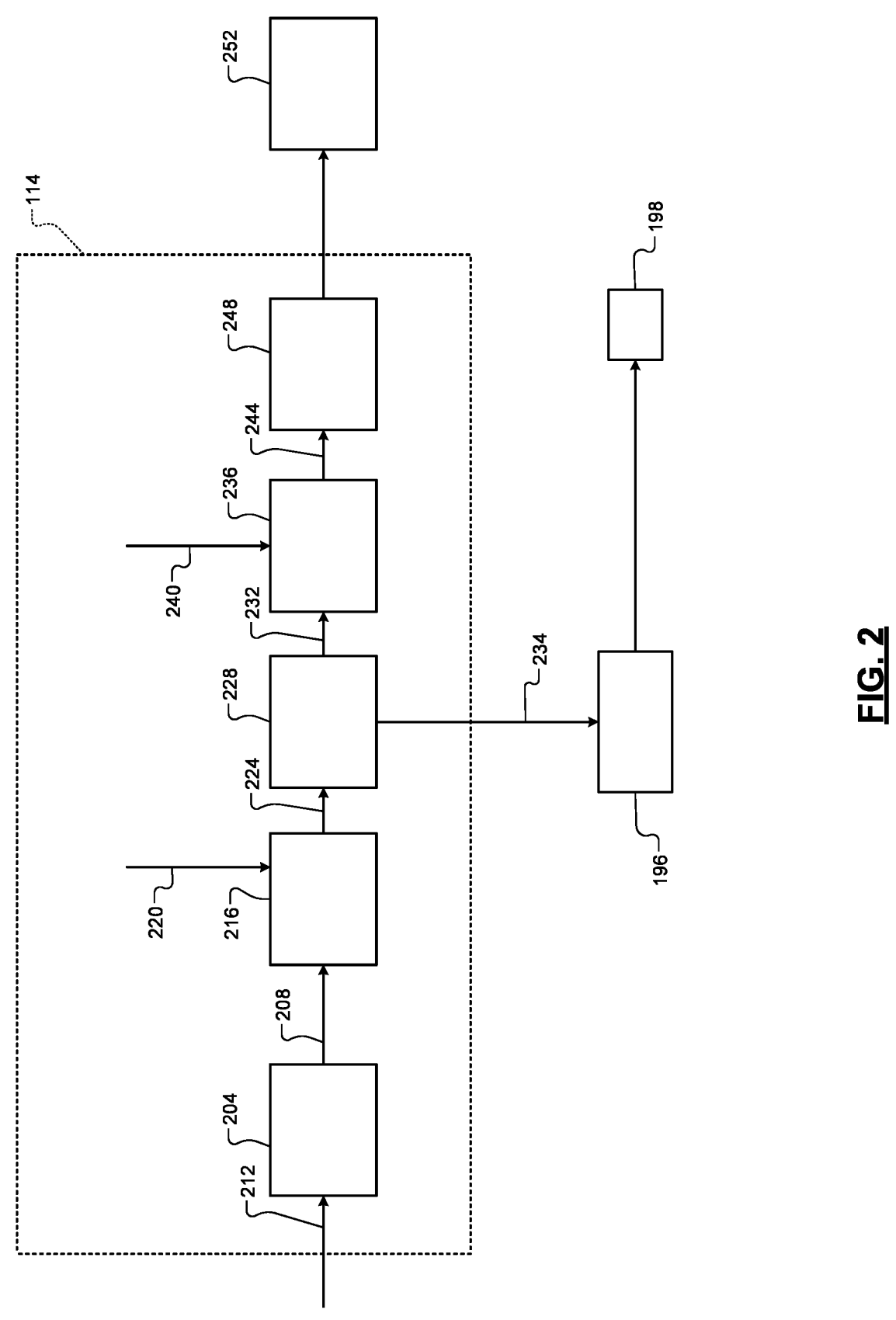
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 may determine the driver torque request 208 using one or more lookup tables or equations that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received drive and axle torque requests 208 and 220, respectively.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request.

In the example of an electric vehicle, the ECM 114 may be omitted, and the driver torque module 204 and the axle torque arbitration module 216 may be implemented within the motor control module 196. In electric vehicles, the driver torque module 204 may input the driver torque request 208 to the motor control module 196, and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module based on the motor torque request 234, as discussed further below. The inverter module converts direct current (DC) power into alternating current (AC) power. The inverter module applies AC power to motor 198. Switching of the inverter module controls torque of the electric motor 198. The inverter module also converts power generated by the electric motor 198 into DC power and outputs DC power for the battery 199, for example, to charge the battery 199.

The inverter module includes a plurality of switches, such as three legs of switches. The motor control module switches the switches to apply alternating current (AC) power to the electric motor 198 to drive the electric motor 198. For example, the inverter module may generate n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198. The output shaft of the electric motor 198 is connected to one or more wheels of the vehicle.

In various implementations, one or more filters (e.g. capacitors) may be electrically connected between the inverter module and the battery 199. The one or more filters may be implemented, for example, to filter power flow to and from the battery 199. As an example, a filter including one or more capacitors and resistors may be electrically connected in parallel with the battery 199 and the inverter module.

Figure 3:
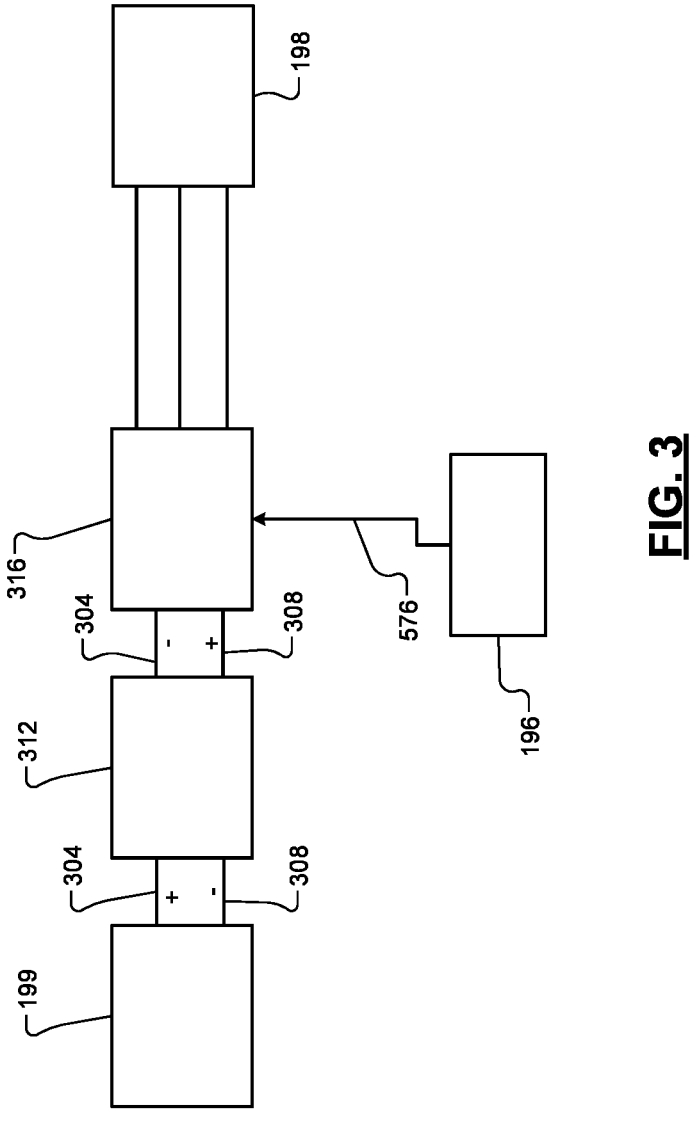
FIG. 3 includes a schematic including an example implementation of a power control system.

FIG. 3 includes a schematic including an example implementation of a power control system. The battery 199 may also be referred to or include a battery pack, as discussed above.

High (positive, DC+) and low (negative, DC−) sides 304 and 308 are connected to positive and negative terminals, respectively, of the battery 199. One or more capacitors, such as capacitor 312, are connected in parallel with the battery 199 between the high and low sides 304 and 308. The capacitor(s) stabilize the DC bus and provide a low impedance voltage source to the inverter module since the battery 199 may have a higher impedance.

An inverter module 316 includes three legs, one leg connected to each phase of the electric motor 198. The inverter module 316 controls current flow to the legs/phases of the electric motor 198. The inverter module 316 converts DC power from the high and low sides 304 and 308 into 3-phase AC power and outputs the AC power to the electric motor 198.

Figure 4:
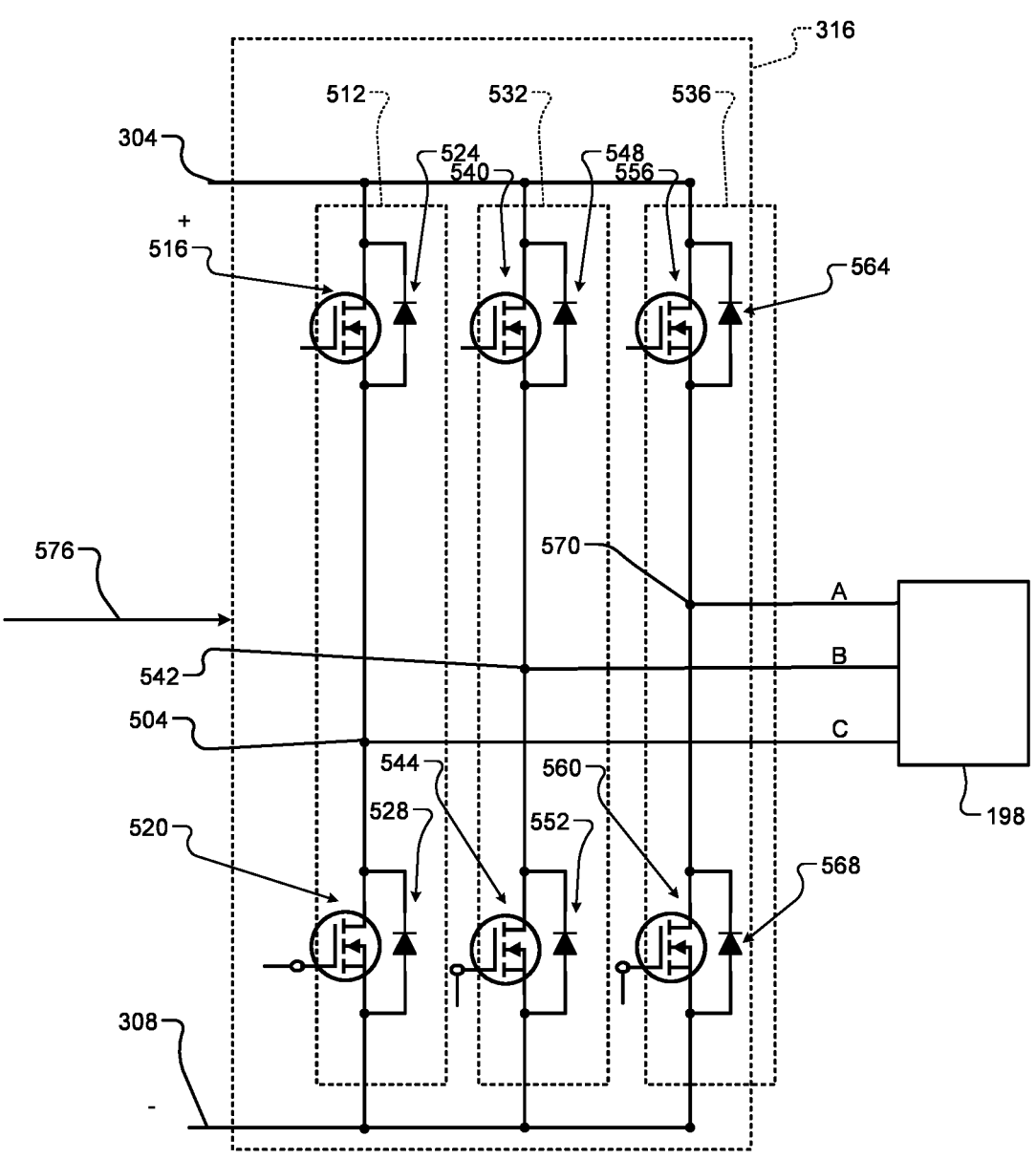
FIG. 4 includes a schematic of an example implementation of an inverter module.

FIG. 4 includes a schematic of an example implementation of the inverter module 316. The inverter module 316 includes three legs. One leg is connected to each phase of the electric motor 198.

A first leg 512 includes first and second switches 516 and 520. The switches 516 and 520 each include a first terminal, a second terminal, and a control terminal. Each of the switches 516 and 520 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 516 is connected to the high side 304. The second terminal of the first switch 516 is connected to a node 504. The second terminal of the second switch 520 may be connected to the low side 308. The node 504 is connected to the second terminal of the first switch 516, the first terminal of the second switch 520, and a first phase (e.g., c) of the electric motor 198.

The first leg 512 may include first and second diodes 524 and 528 connected anti-parallel to the switches 516 and 520, respectively. In other words, an anode of the first diode 524 may be connected to the second terminal of the first switch 516, and a cathode of the first diode 524 may be connected to the first terminal of the first switch 516. An anode of the second diode 528 may be connected to the second terminal of the second switch 520, and a cathode of the second diode 528 may be connected to the first terminal of the second switch 520. The diodes 524 and 528 form one phase of a three-phase rectifier for converting power from the electric motor 198 into power for the battery 199. However, the diodes 524 and 528 may be omitted, such as if switches 516, 540, 556, 520, 544, and 560 are MOSFETS (with a built-in diode). The diodes 524 and 528 may be included if included with a power module of an IGBT.

The inverter module 316 also includes second and third legs 532 and 536. The second and third legs 532 and 536 may be (circuitry wise) similar or identical to the first leg 512. In other words, the second and third legs 532 and 536 may each include respective switches and diodes like the switches 516 and 520 and the diodes 524 and 528, connected in the same manner as the first leg 512. For example, the second leg 532 includes switches 540 and 544 and anti-parallel diodes 548 and 552. A node 542 is connected to the first terminal of the switch 544, and a second stator winding (e.g., b) of the electric motor 198. The third leg 536 includes switches 556 and 560, and anti-parallel diodes 564 and 568. A node 570 is connected to the first terminal of the switch 560 and a third stator winding (e.g., a) of the electric motor 198. Like the diodes 524 and 528, the diodes 548, 552, 564, and 568 may be omitted.

Control terminals of the switches of the inverter module 316 are connected to switch signals 576 from the motor control module 196. The motor control module 196 generates the switch signals 576 such that the high side switch of a leg is on while the low side switch of that leg is off and vice versa. The motor control module 196 generates the switch signals 576 using pulse width modulation (PWM) control.

The control signals of the gates of the low side switches 520, 544, and 560 may be inverted such that the control signals applied to the low side switches 520, 544, and 560 are opposite in polarity to the control signals applied to the gates of the high side switches 516, 540, and 556.

Figure 5:
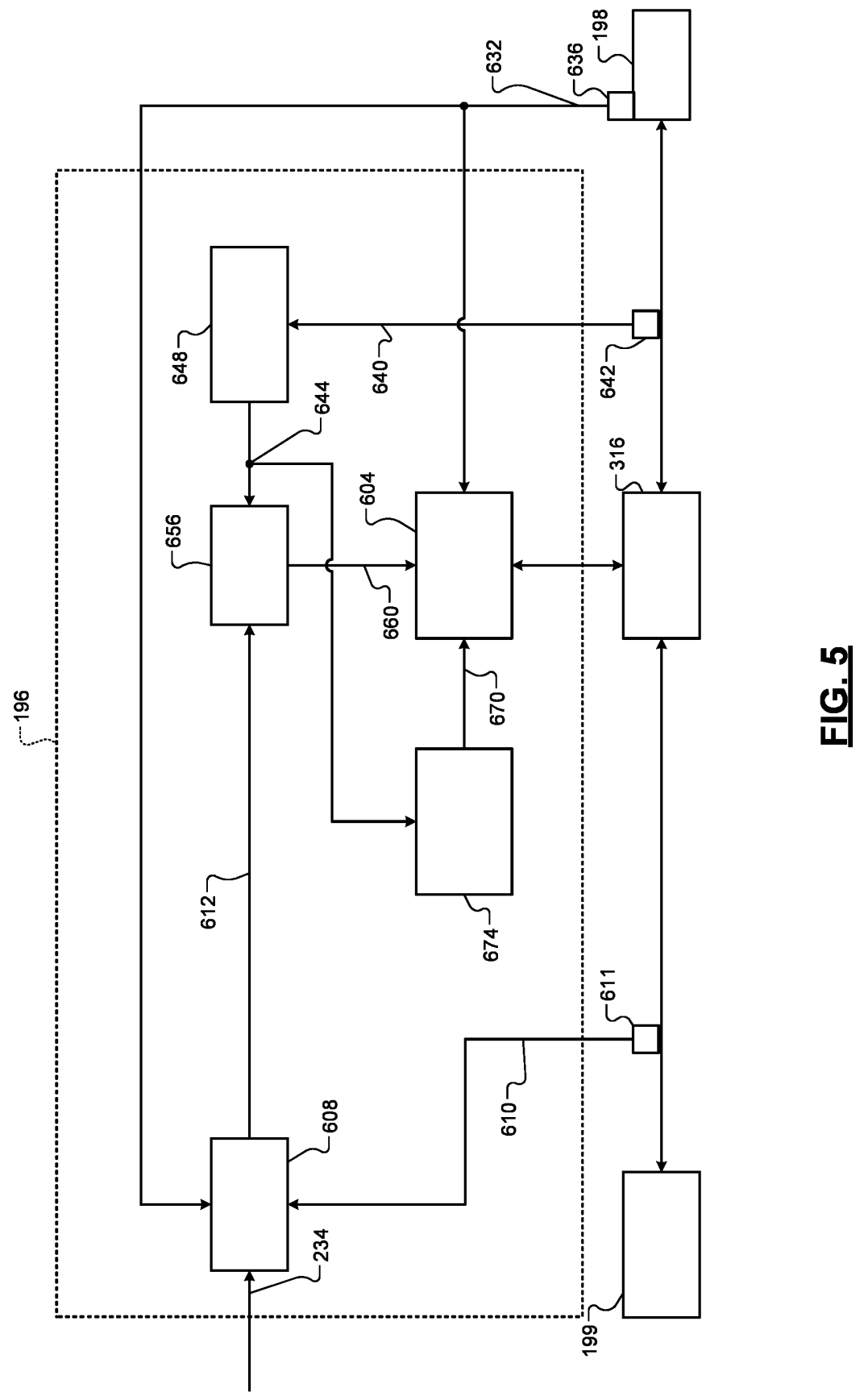
FIG. 5 includes a functional block diagram of an example motor control module.

FIG. 5 is a functional block diagram of an example implementation of the motor control module 196. A switching module 604 controls switching of the switches 516 and 520 using pulse width modulation (PWM) signals. For example, the switching module 604 applies PWM signals to the control terminals of the switches 516, 520, 540, 544, 556, and 560. When a high side switch is on, power flows from the battery 199 to the electric motor 198 to drive the electric motor 198.

The states of the high and low side switches of each phase are complementary (opposite) given the inversion of the signals applied to the gates of the low side switches 520, 544, and 560. For example, the low side switch 520 of the first leg 512 is off when the high side switch 516 of the first leg 512 is on and vice versa. The low side switch 544 of the second leg 532 is off when the high side switch 540 of the second leg 532 is on and vice versa. The low side switch 560 of the third leg 536 is off when the high side switch 556 of the third leg 536 is on and vice versa.

The PWM signals provided to the second and third legs 532 and 536 may be phase shifted from each other and from the PWM signals provided to the switches 516 and 520 of the first leg 512. For example, the PWM signals for each leg may be phase shifted from each other leg by 120° (360°/3 legs=120° shift per leg). In this way, the currents through the stator windings (phases) of the electric motor 198 may be phase shifted by 120° from each other. Different types of PWM schemes for three phase voltage source inverters may be used, such as space vector modulation, sine triangle modulation, third harmonics injection modulation, discontinuous modulation, or another suitable PWM scheme.

A current command module 608 determines a d-axis current command (Id Command) and a q-axis current command (Iq Command) for the electric motor 198 based on the motor torque request 234, a (mechanical) rotor speed 632 of the electric motor 198, and a DC bus voltage 610. The current command module 608 may determine the d- and q-axis current commands using one or more equations and/or lookup tables that relate motor torque requests, rotor speeds, and DC bus voltages to d- and q-axis current commands.

The d-axis current command and the q-axis current command are collectively illustrated by 612 in FIG. 5. A voltage sensor 611 measures the DC bus voltage 610 between the battery 199 and the inverter module 316 (e.g., between the high and low sides 304 and 308), such as a voltage across a DC bus capacitor. The axis of the magnet field or rotor winding field is called the rotor direct axis or the d-axis. The axis that is 90 degrees after the d-axis is called the quadrature axis or q-axis.

The rotor speed 632 is a (mechanical) rotational speed of the rotor of the electric motor 198. The rotor speed 632 may be measured, for example, using a rotor speed sensor 636. In various implementations, the rotor speed 632 may be determined by a rotor speed module based on one or more other parameters, such change in position of the rotor over time where position is determined based on currents 640 of the electric motor 198. In various implementations, the rotor speed sensor 636 may determine a position of the rotor, and the rotor speed sensor 636 (or a speed module, such as of the motor control module 196) may determine the rotor speed 632 based on a change in the rotor position over time (e.g., using a mathematical derivative of the position with respect to time). Current sensors 642 may measure the phase currents 640 (e.g., Ia, Ib, Ic), such as in the respective legs of the inverter module 316. In various implementations, one or more of the phase currents 640 may be estimated.

A voltage command module 656 (which may be referred to as a current regulator) determines voltage commands for the electric motor 198 based on the d-axis current command, the q-axis current command, a d-axis current of the electric motor 198, and a q-axis current of the electric motor 198. The d-axis voltage command and the q-axis voltage command are collectively illustrated by 660 in FIG. 5. In various implementations, the voltage command module 656 may generate the voltage commands 660 using closed-loop control based on or to adjust the d and q-axis currents 644 toward or to the d and q-axis current commands 612, respectively. A frame of reference (FOR) module 648 may transform the phase currents 640 into the d and q-axis currents 644 by applying a Clarke transform and a Park transform.

The switching module 604 determines duty cycles of the PWM signals to apply to the switches of the inverter module 316 to produce voltage for the electric motor 198, respectively, based on the d and q-axis voltage commands. For example, the switching module 604 may determine PWM duty cycle using one or more schemes (e.g., algorithms) which utilize equations or lookup tables that relate voltage commands to PWM duty cycles. Example PWM schemes for three phase voltage source inverters include, but are not limited to, space vector modulation, sine triangle modulation, third harmonic injection modulation, and discontinuous modulation.

The switching module 604 switches the switches of the inverter module 316 based on the PWM duty cycles for the phases, respectively, and a target switching frequency 670. The duty cycle of a phase corresponds to the period that the high side switch of the phase is on (closed) during the period corresponding to the target switching frequency 670 (period=1/target switching frequency). PWM schemes may have a fixed switching frequency with a modulated duty cycle.

A target frequency module 674 sets the target switching frequency 670. The target frequency module 674 may set the target switching frequency 670 for each phase. More specifically, the target frequency module 674 sets the target switching frequency for the first phase, the target switching frequency for the second phase, and the target switching frequency for the third phase of the inverter module 316. The target switching frequency for each phase may be the same. The switching module 604 switches the switches of the phases of the inverter module 316 based on the PWM duty cycles and the target switching frequencies of the phases, respectively.

Figure 6:
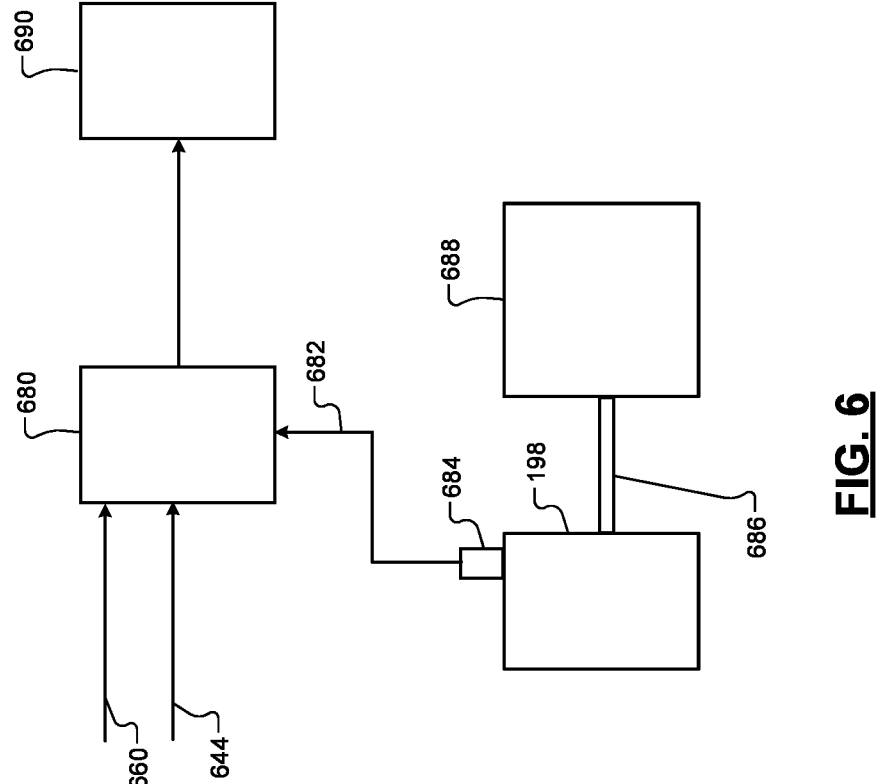
FIG. 6 is a functional block diagram of a fault detection system.

FIG. 6 is a functional block diagram of a fault detection system. A fault detection module 680 detects the presence of an eccentricity fault in the electric motor 198 based on vibration 682 of the motor 198 measured using a vibration sensor 684 and incremental inductance of the motor determined based on the d and q-axis currents 644. The fault detection module 680 may detect the presence of the eccentricity fault further based on the voltage commands 660.

The output shaft 686 of the motor 198 may be connected to a dynamometer 688 for the detection of whether the motor 198 has an eccentricity fault. In various implementations, the dynamometer 688 may be omitted. If the dynamometer 388 is omitted, eccentricity faults may be detected based on the incremental inductance and vibration based analysis. When the motor 198 includes an eccentricity fault, the fault detection module 680 may visually display that the motor 198 has an eccentricity fault, such as by illuminating an indicator 690. The fault detection module 680 may additionally or alternatively perform one or more other remedial actions when the motor 198 has an eccentricity fault, such as, via the motor control module 196, disable the motor 198. Eccentricity of the motor 198 may refer to the extent to which the center of the stator is aligned with the center of the rotor and the axis of the output shaft 686.

Eccentricity of the motor 198 may be expressed as a value between 0 and 100 or in another suitable manner. In the example of values between 0 and 100, 0 may indicate that the center of the stator is aligned with both the center of the rotor and the axis of the output shaft (the line through the axis of the output shaft would extend through both the center of the rotor and the center of the stator). 100 may indicate that the center of the stator is misaligned from the center of the rotor and the axis of the output shaft by at least a predetermined distance (e.g., radial distance). While this example will be described herein, the present application is also applicable to other forms of expression of eccentricity.

Figure 7:
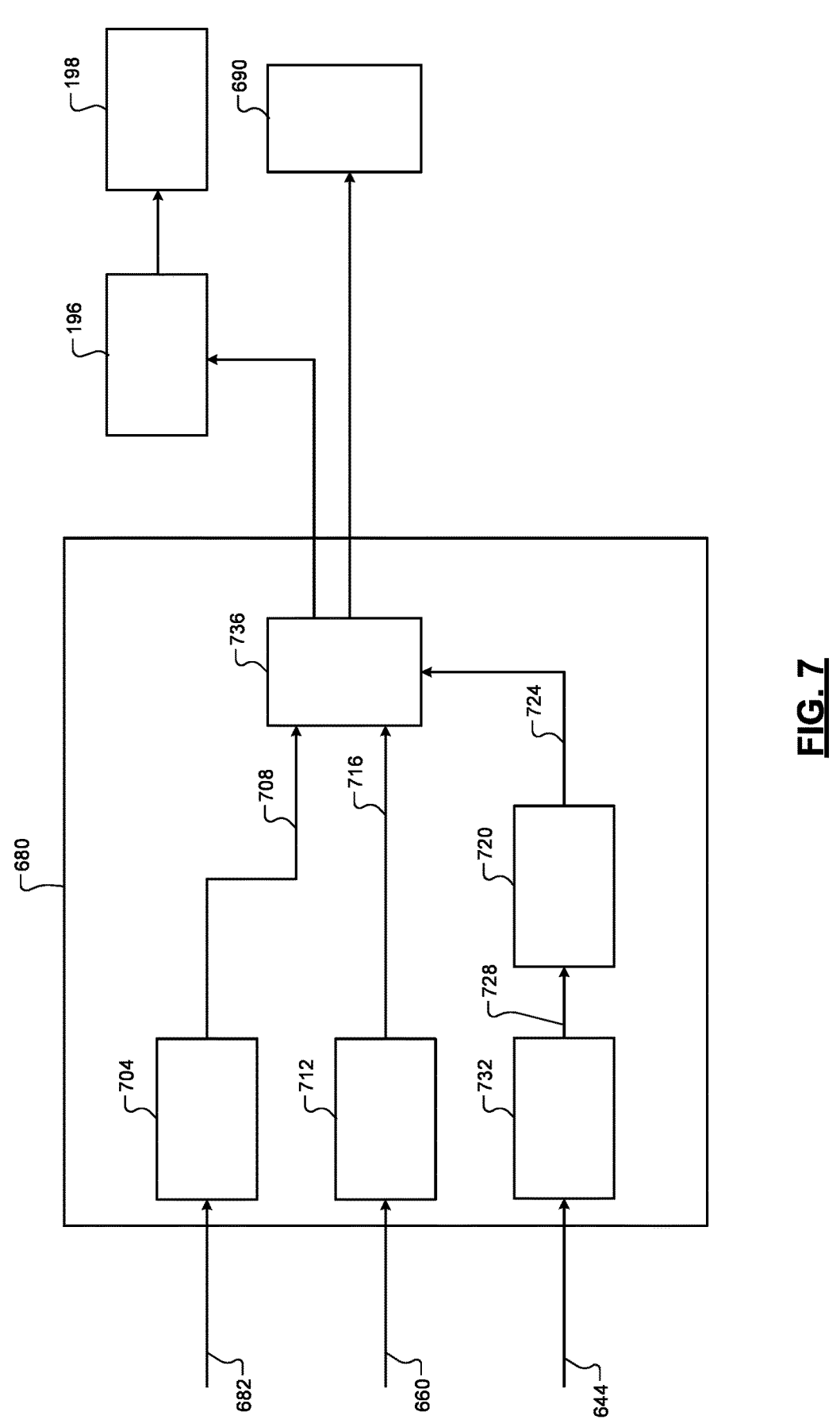
FIG. 7 is a functional block diagram of an example implementation of a fault detection module.

FIG. 7 is a functional block diagram of an example implementation of the fault detection module 680. A vibration eccentricity module 704 determines a vibration eccentricity 708 of the motor 198 based on vibration 682 of the motor 198 by the vibration sensor 684. The vibration eccentricity module 704 may determine the vibration eccentricity 708 using a lookup table or an equation that relates one or more characteristics of the vibration 682 to vibration eccentricity. As discussed above, in an example the vibration eccentricity 708 may be expressed as a value between 0 and 100. The motor control module 196 operates the motor 198 at predetermined operating conditions for the determination of the vibration eccentricity 708.

A voltage eccentricity module 712 determines a voltage eccentricity 716 of the motor 198 based on one or more of the voltage commands 660 for the motor 198. The voltage eccentricity module 712 may determine the voltage eccentricity 716 using a lookup table or an equation that relates one or more of the voltage commands 660 to voltage eccentricity. As discussed above, in an example the voltage eccentricity 716 may be expressed as a value between 0 and 100. The motor control module 196 operates the motor 198 at predetermined operating conditions for the determination of the voltage eccentricity 716.

An inductance eccentricity module 720 determines an inductance eccentricity 724 of the motor 198 based on one or more points on an incremental inductance curve (profile) 728 for the motor 198. The inductance eccentricity module 720 may determine the inductance eccentricity 724 using a lookup table or an equation that relates one or more characteristics of the incremental inductance curve 728 to inductance eccentricity. As discussed above, in an example the inductance eccentricity 724 may be expressed as a value between 0 and 100. The motor control module 196 operates the motor 198 at predetermined operating conditions for the determination of the incremental inductance curve 728.

An incremental inductance module 732 determines the incremental inductance curve 728 based on, for example, one or more of the d and q-axis currents 644 of the motor 198.

A fault module 736 determines whether the motor 198 has an eccentricity fault based on the vibration eccentricity 708 and the inductance eccentricity 724 as discussed below. The fault module 736 may additionally determine whether the motor 198 has an eccentricity fault further based on the voltage eccentricity 716, as discussed further below.

When the motor 198 has an eccentricity fault, the fault module 736 may take one or more actions. For example, the fault module 736 may visually indicate output an indicator that the motor 198 has an eccentricity fault, such as by turning on the indicator 690. Additionally or alternatively, the fault module 736 may command the motor control module 196 to disable the electric motor 198 and/or limit the torque output of the motor 198 to a predetermined fault torque.

Figure 8:
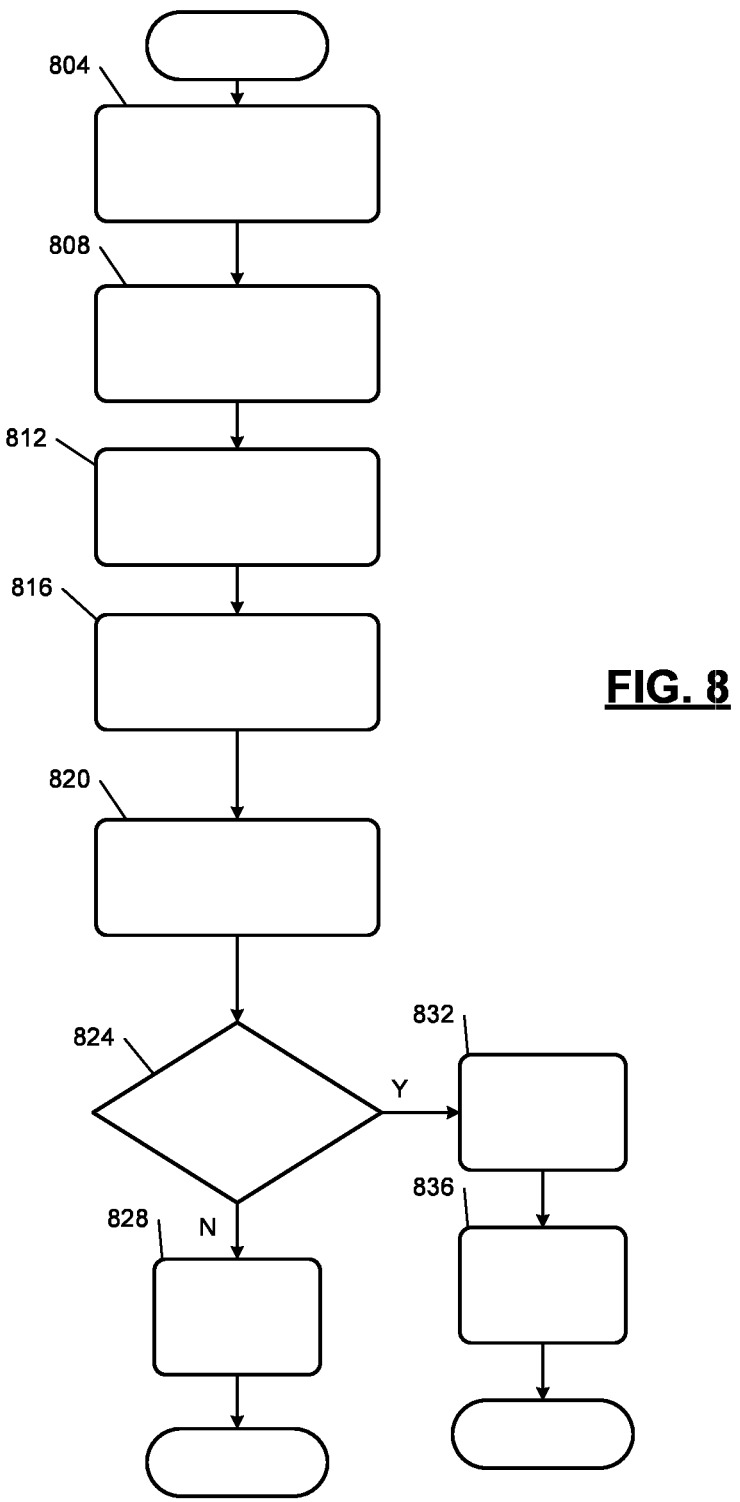
FIGS. 8-10 are flowcharts depicting an example method of detecting an eccentricity fault of the motor.
Figure 9:
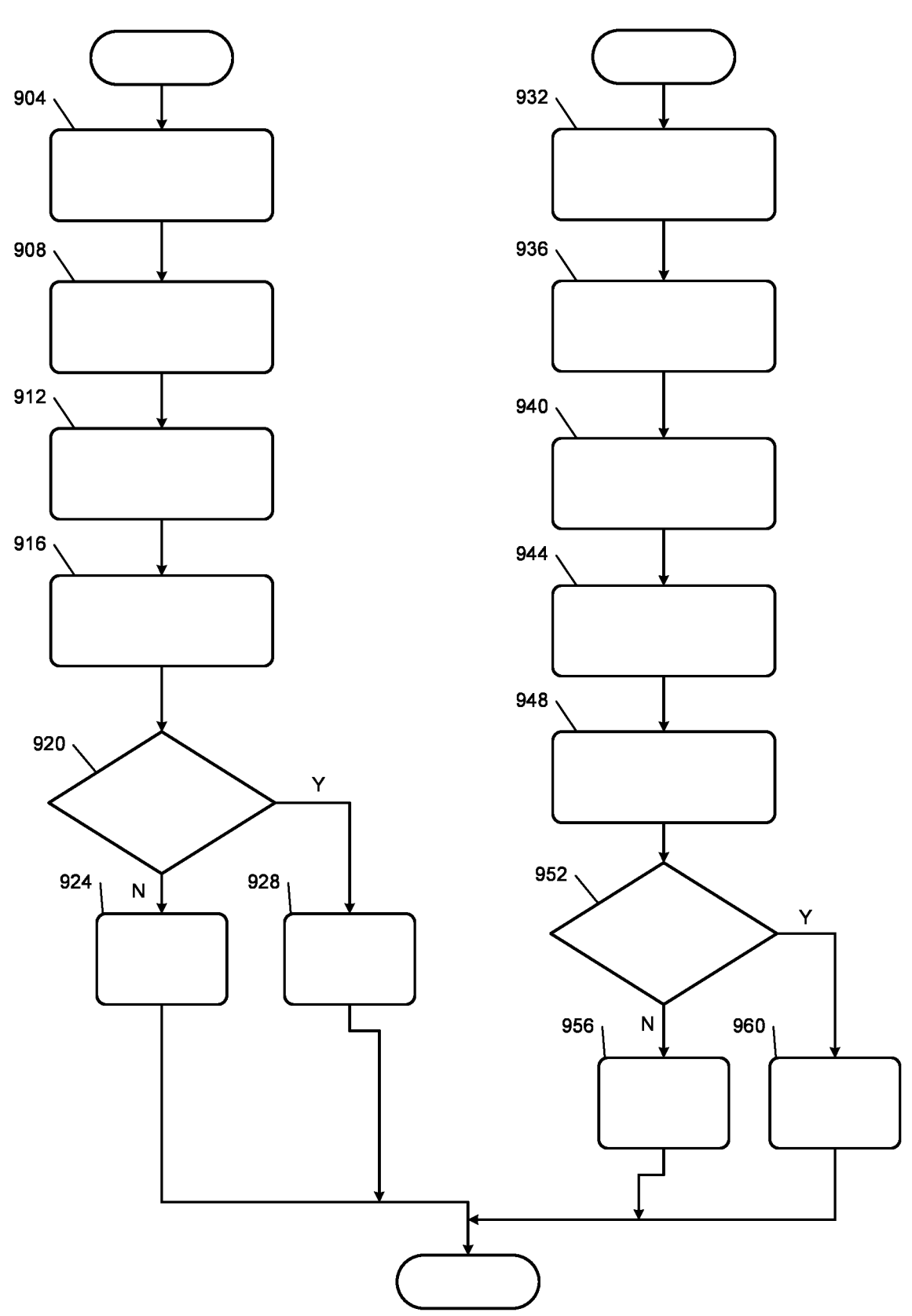
Figure 10:
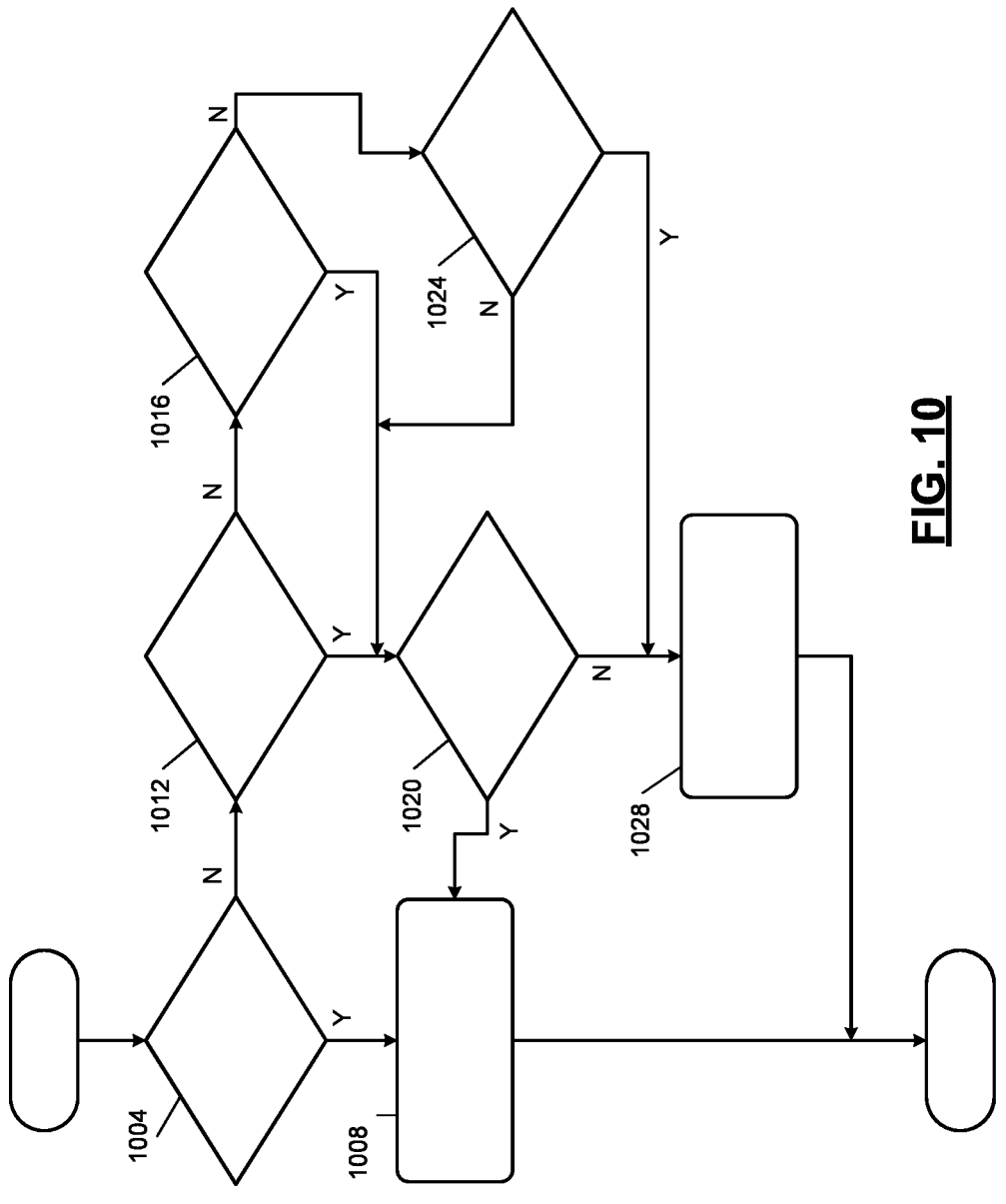

FIGS. 8-10 are flowcharts depicting an example method of detecting an eccentricity fault of the motor 198. FIG. 8 is a flowchart depicting an example method of determining the vibration eccentricity. FIG. 9 is a flowchart depicting example methods of determining the inductance and voltage eccentricities. FIG. 10 is a flowchart depicting an example method of determining whether the motor 198 has an eccentricity fault. FIGS. 8-10 may be performed in a predetermined order.

Referring now to FIG. 8, control begins with 804 where the motor control module 196 selects one or more operating parameters of the motor 198 for detecting eccentricity based on vibration. For example, the one or more operating parameters may include a predetermined speed of the motor 198 that is greater than zero, such as 1000 revolutions per minute or another suitable speed.

At 808, the motor control module 196 operates the motor 198 at the selected operating parameter(s) (e.g., the predetermined speed). At 812, the vibration sensor 684 measures vibration of the motor 198 during operation of the motor 198 at the selected operating parameter(s).

At 816, the vibration eccentricity module 704 determines amplitudes of vibration and predetermined frequencies, respectively, such as by applying a fast Fourier transform (FFT) to the vibration signal from the vibration sensor 684. At 820, the vibration eccentricity module 704 determines the vibration eccentricity 708 based on one or more of the amplitudes of vibration at one or more of the frequencies, respectively. For example, the vibration eccentricity module 704 may determine the vibration eccentricity 708 using one or more equations and/or lookup tables that relate amplitude(s) to vibration eccentricities.

At 824, the fault module 736 may determine whether the vibration eccentricity is greater than a predetermined value. The predetermined value may be, for example, 0.75 (75%) using the example value range above or another suitable value. If 824 is true, the fault module 736 may indicate that the motor 198 has an eccentricity fault at 832, and control may continue with 836. At 836, the vibration eccentricity module 704 may determine an amplitude of acceleration of the vibration of the motor 198 at one of the frequencies. If 824 is false, the fault module 736 may indicate that the motor 198 does not have an eccentricity fault at 828.

Control may continue with I (FIG. 9) after 828 or 836.

Referring now to FIG. 9, control may begin with 904 where the motor control module 196 selects one or more operating parameters of the motor 198 for detecting eccentricity based on voltage commands. For example, the one or more operating parameters may include a predetermined speed of the motor 198 that is greater than zero, such as 1000 revolutions per minute or another suitable speed, and a predetermined torque that is greater than zero, such as 50 newton meters or another suitable torque, 0, or a predetermined negative torque. At 908, the motor control module 196 operates the motor 198 at the selected operating parameter(s).

At 912, the voltage eccentricity module 712 receives the voltage commands 660 used to operate the motor at the selected operating parameters (e.g., predetermined speed and predetermined torque). At 916, the voltage eccentricity module 712 determines the voltage eccentricity 716 based on the voltage commands 660. For example, the voltage eccentricity module 712 may determine the voltage eccentricity 716 using one or more equations and/or lookup tables that relate amplitude(s) to voltage eccentricities.

At 920, the fault module 736 may determine whether the voltage eccentricity 716 is greater than a predetermined value. The predetermined value may be, for example, 0.75 (75%) using the example value range above or another suitable value. If 920 is false, the fault module 736 may indicate that a first eccentricity (A) for the motor 198 is healthy (no eccentricity fault) at 924, and control may continue with II (FIG. 10). If 920 is true, the fault module 736 may indicate that the motor 198 that the first eccentricity (A) has eccentricity at 928, and control may continue with II.

932-960 may be performed after or before 904-928. At 932, where the motor control module 196 selects one or more operating parameters of the motor 198 for detecting eccentricity based on incremental inductance of the motor 198. For example, the one or more operating parameters may include a predetermined maximum d-axis current to saturate the motor 198. In various implementations, the one or more operating parameters include a predetermined range of d-axis current. At 936, the motor control module 196 operates the motor 198 at the selected operating parameter(s).

Figure 11:
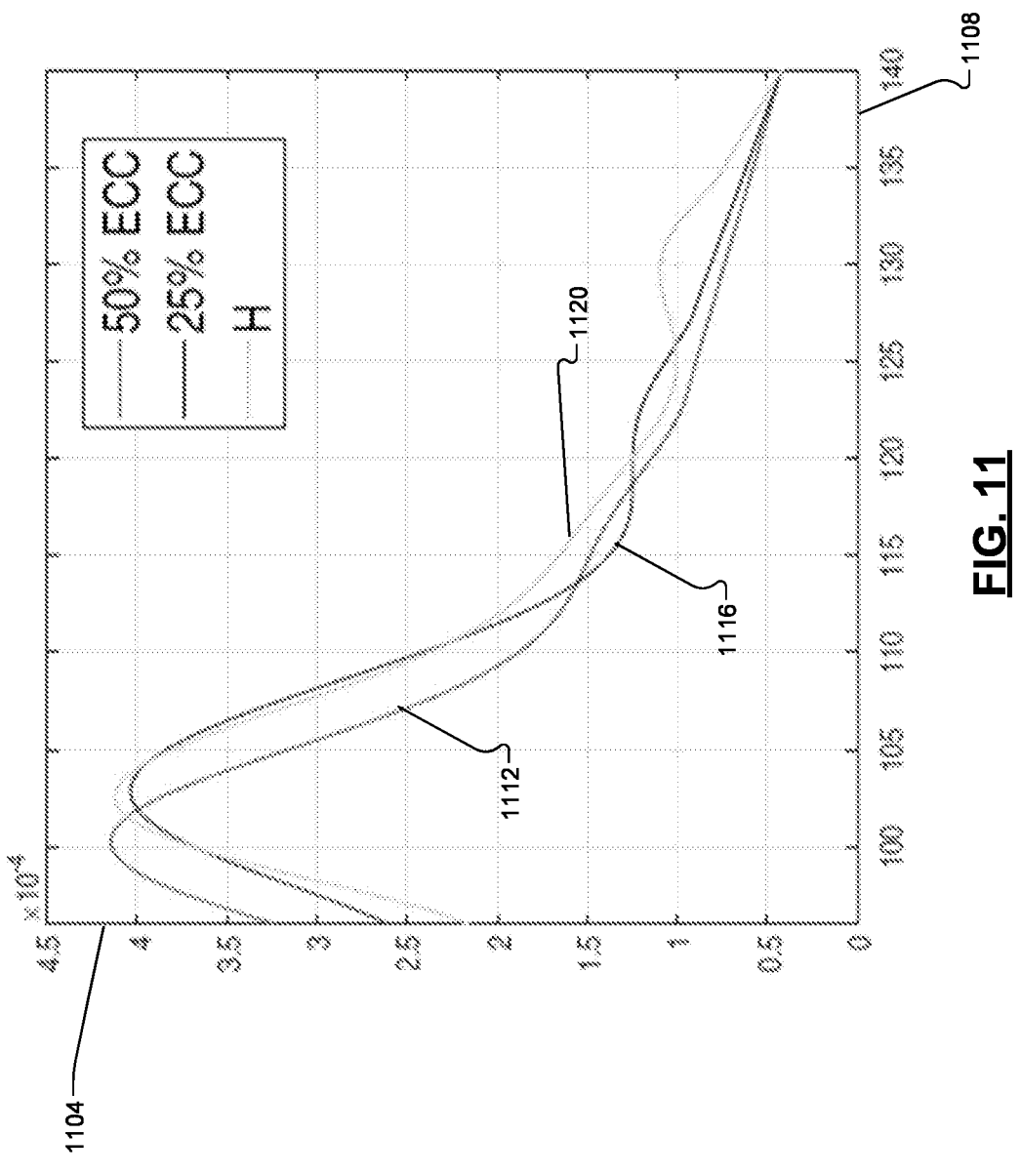
FIG. 11 includes an example graph of incremental inductance versus d-axis current for motors of different levels of eccentricity.

At 940, the incremental inductance module 732 determines the incremental inductance curve 728 for the motor 198 during operation of the motor 198 at the selected operating parameters, such as based on the d-axis current of the motor 198. FIG. 11 includes an example graph of incremental inductance 1104 versus d-axis current 1108. Traces 1112, 1116, and 1120 are for decreasing (better) motor eccentricity.

At 944, the inductance eccentricity module 720 determines the d-axis current (e.g., 1108) at the second peak (hump) in the incremental inductance curve 728 and the incremental inductance (e.g., 1104), which may also be referred to as height, at that d-axis current. For example, the inductance eccentricity module 720 may determine the height of the peak from the piecewise linear trend of the curve to determine the eccentricity. There is a difference between an absolute peak and a peak of curve from the piecewise linear trend of the curve. At 948, the inductance eccentricity module 720 determines the inductance eccentricity 724 based on the d-axis current and the incremental inductance determined at 944. For example, the inductance eccentricity module 720 may determine the inductance eccentricity 724 using one or more equations and/or lookup tables that relate d-axis currents and incremental inductances to inductance eccentricities.

At 952, the fault module 736 may determine whether the inductance eccentricity 724 is greater than a predetermined value. The predetermined value may be, for example, 0.75 (75%) using the example value range above or another suitable value. If 952 is false, the fault module 736 may indicate that a second eccentricity (B) for the motor 198 is healthy (no eccentricity fault) at 956, and control may continue with II (FIG. 10). If 952 is true, the fault module 736 may indicate that the motor 198 that the second eccentricity (B) has eccentricity at 960, and control may continue with II.

Referring now to FIG. 10, at 1004, the fault module 736 determines whether the first and second eccentricities (A and B) both indicate that the motor 198 is healthy. If 1004 is true, the fault module 736 may output an indicator that the motor 198 does not have an eccentricity fault at 1008, and control may end. If 1004 is false, control may transfer to 1012.

At 1012, the fault module 736 may determine whether the first eccentricity (A) indicates no eccentricity (healthy) and the inductance eccentricity value 724 is less than a second predetermined value. The second predetermined value may be less than or equal to the predetermined value that was compared with the inductance eccentricity value 724 at 952. If 1012 is true, control may continue with 1020. If 1012 is false, control may continue with 1016.

At 1016, the fault module 736 may determine whether the second eccentricity (B) indicates no eccentricity (healthy) and the voltage eccentricity value 716 is less than a second predetermined value. The second predetermined value may be less than or equal to the predetermined value that was compared with the voltage eccentricity value 716 at 920. If 1016 is true, control may continue with 1020. If 1016 is false, control may continue with 1024.

At 1020, the fault module 736 may determine whether the amplitude of vibration (from 836) is less than a predetermined value. If 1020 is true, control continues with 1008 where the fault module 736 indicates that the motor 198 does not have an eccentricity fault. If 1020 is false, control continues with 1028. At 1028 the fault module 736 may output an indicator that the motor 198 has an eccentricity fault at 1008. One or more other remedial actions may be taken. For example, the fault module 736 may disable the motor 198 or limit torque output of the motor 198. The motor 198 may be replaced with a non-faulty motor prior to the vehicle leaving manufacturing. At 1024, the fault module 736 may determine whether both the vibration eccentricity value 716 and the inductance eccentricity value 724 is greater than the second predetermined value. If 1024 is true, control continues with 1028. If 1024 is false, control may transfer to 1020.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An eccentricity detection system comprising:
a vibration eccentricity module configured to determine a vibration eccentricity of an electric motor based on vibration of the electric motor measured during operation of the electric motor;
an inductance eccentricity module configured to determine an inductance eccentricity of the electric motor based on an incremental inductance curve of the electric motor; and
a fault module configured to selectively indicate that the electric motor includes an eccentricity fault when both (a) the vibration eccentricity of the electric motor is greater than a first predetermined value and (b) the inductance eccentricity of the electric motor is greater than a second predetermined value.

2. The eccentricity detection system of claim 1 further comprising a voltage eccentricity module configured to determine a voltage eccentricity of the electric motor based on a voltage command for the electric motor,
wherein the fault module is configured to indicate whether the electric motor includes an eccentricity fault further based on the voltage eccentricity.

3. The eccentricity detection system of claim 2 wherein the fault module is configured to selectively indicate that the electric motor has an eccentricity fault when the voltage eccentricity is greater than a third predetermined value.

4. The eccentricity detection system of claim 2 wherein the voltage command is a d-axis voltage command.

5. The eccentricity detection system of claim 2 wherein the voltage command is a q-axis voltage command.

6. The eccentricity detection system of claim 2 wherein the voltage eccentricity module is configured to determine the voltage eccentricity of the electric motor when the electric motor is operating at a predetermined speed.

7. The eccentricity detection system of claim 2 wherein the voltage eccentricity module is configured to determine the voltage eccentricity of the electric motor when the electric motor is operating at a predetermined torque.

8. The eccentricity detection system of claim 1 wherein the vibration eccentricity module is configured to determine the vibration eccentricity of the electric motor when the electric motor is operating at a predetermined speed.

9. The eccentricity detection system of claim 1 wherein the vibration eccentricity module is configured to determine the vibration eccentricity of the electric motor based on an amplitude of the vibration of the electric motor at a predetermined frequency.

10. The eccentricity detection system of claim 1 wherein the inductance eccentricity module configured to determine the inductance eccentricity of the electric motor based on a d-axis current of the electric motor at a predetermined point on the incremental inductance curve of the electric motor.

11. The eccentricity detection system of claim 10 wherein the predetermined point is a peak of the incremental inductance curve.

12. The eccentricity detection system of claim 11 wherein the peak is a second highest peak of the incremental inductance curve.

13. The eccentricity detection system of claim 1 wherein the inductance eccentricity module is configured to determine the inductance eccentricity of the electric motor when a d-axis current of the electric motor is set to a predetermined maximum current.

14. The eccentricity detection system of claim 1 wherein the fault module is configured to indicate that the electric motor includes an eccentricity fault when both (a) the vibration eccentricity of the electric motor is greater than a predetermined value and (b) the inductance eccentricity of the electric motor is less than a second predetermined value.

15. The eccentricity detection system of claim 1 wherein the fault module is configured to selectively indicate that the electric motor includes an eccentricity fault when the vibration eccentricity of the electric motor is greater than a predetermined value and the inductance eccentricity of the electric motor is greater than a second predetermined value.

16. The eccentricity detection system of claim 1 wherein the fault module is configured to selectively indicate that the electric motor includes an eccentricity fault when the inductance eccentricity of the electric motor is greater than a predetermined value and the vibration eccentricity of the electric motor is less than a second predetermined value.

17. The eccentricity detection system of claim 16 wherein the fault module is configured to selectively indicate that the electric motor includes an eccentricity fault when the inductance eccentricity of the electric motor is greater than a predetermined value, the vibration eccentricity of the electric motor is less than a second predetermined value, and an amplitude of vibration at a frequency is less than a third value.

18. The eccentricity detection system of claim 1 wherein:

the vibration eccentricity is a value within a range between 0 and 100; and the inductance eccentricity is a value within a range between 0 and 100.

19. The eccentricity detection system of claim 18 wherein:

the first predetermined value is 75; and the second predetermined value is 75.

20. An eccentricity detection method comprising:

determining a vibration eccentricity of an electric motor based on vibration of the electric motor measured during operation of the electric motor;

determining an inductance eccentricity of the electric motor based on an incremental inductance curve of the electric motor; and selectively indicating that the electric motor includes an eccentricity fault when both (a) the vibration eccentricity of the electric motor is greater than a first predetermined value and (b) the inductance eccentricity of the electric motor.

\* \* \* \* \*